United States Patent
Kanamori

(10) Patent No.: US 11,032,442 B2
(45) Date of Patent: Jun. 8, 2021

(54) IMAGE PROCESSING APPARATUS AND IMAGE PROCESSING METHOD

(71) Applicant: TOSHIBA TEC KABUSHIKI KAISHA, Tokyo (JP)

(72) Inventor: Keiko Kanamori, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 16/354,676

(22) Filed: Mar. 15, 2019

(65) Prior Publication Data

US 2020/0296254 A1 Sep. 17, 2020

(51) Int. Cl.
*H04N 1/40* (2006.01)
*H04N 1/409* (2006.01)
*H04N 1/407* (2006.01)

(52) U.S. Cl.
CPC ......... *H04N 1/40012* (2013.01); *H04N 1/409* (2013.01); *H04N 1/4074* (2013.01)

(58) Field of Classification Search
CPC ... H04N 1/40012; H04N 1/409; H04N 1/4074
See application file for complete search history.

(56) References Cited

U.S. PATENT DOCUMENTS

| | | | |
|---|---|---|---|
| 8,699,791 B2 | 4/2014 | Muraishi | |
| 2012/0087577 A1* | 4/2012 | Muraishi | H04N 1/4074 382/164 |
| 2018/0068199 A1* | 3/2018 | Itoh | H04N 1/4074 |

* cited by examiner

*Primary Examiner* — Christopher Wait
(74) *Attorney, Agent, or Firm* — Kim & Stewart LLP

(57) ABSTRACT

An image processing apparatus of an embodiment includes an image processing unit to convert a color image to a monochrome image. The color image comprises pixels with a plurality of color components. The image processing unit is configured to generate a histogram from the monochrome image showing a color intensity gradation in the monochrome image by pixel frequency. A processor is configured to obtain a first threshold value based on the histogram, determine for each color component of each pixel in the color image whether or not each color component of the pixel is light based on the first threshold value, and generate a corrected color image by removing a background coloring from the color image by correcting each pixel for which all the color components are determined to be light.

12 Claims, 12 Drawing Sheets

FIG. 10
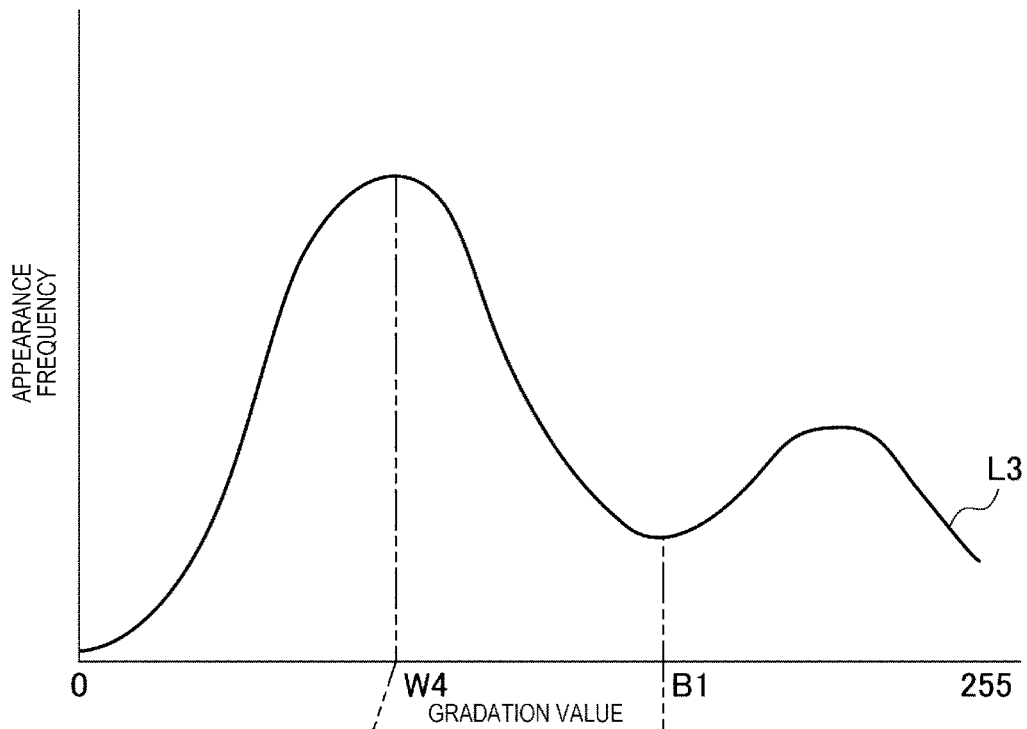
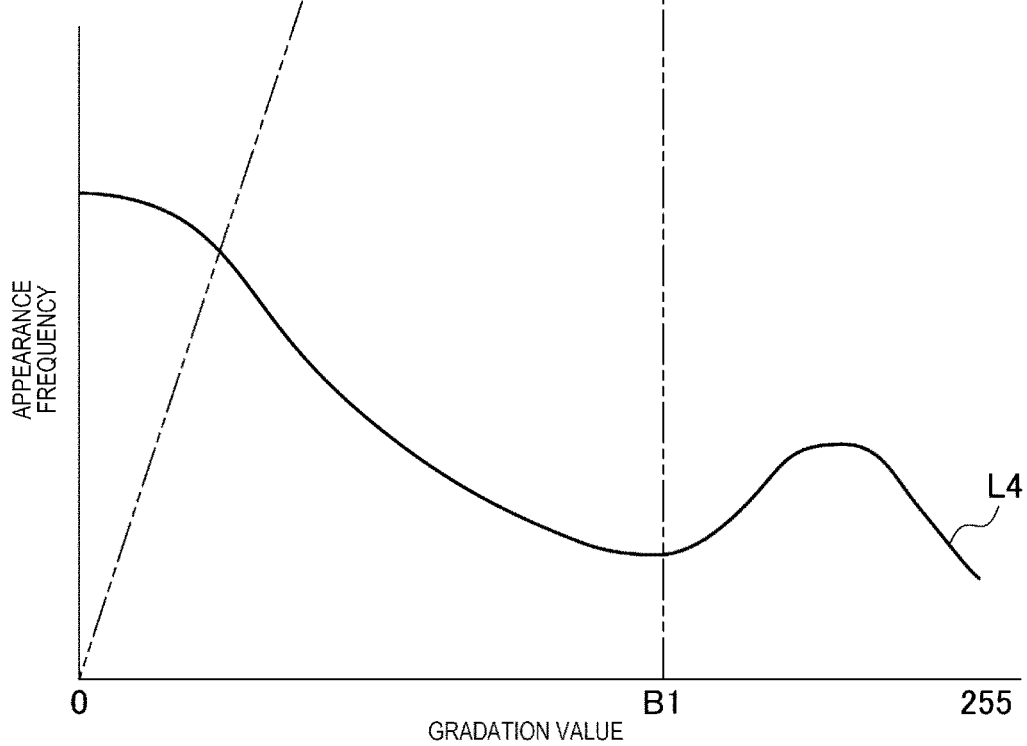

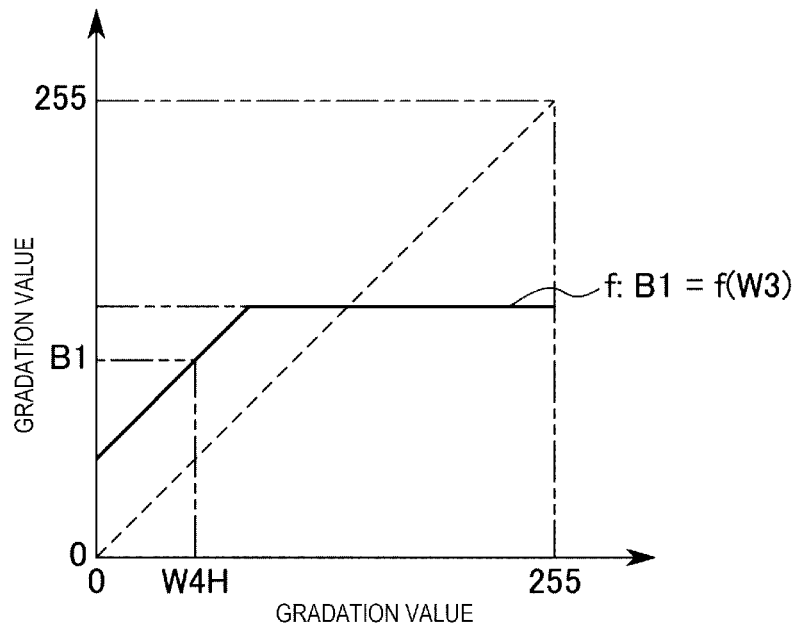

IMAGE PROCESSING APPARATUS AND IMAGE PROCESSING METHOD

FIELD

Embodiments described herein relate generally to an image processing apparatus and an image processing method.

BACKGROUND

In an image processing apparatus, such as multifunction peripheral (MFP), a method of removing a background coloring from a document image is known. For example, the image processing apparatus converts an input image into a monochrome image and generates a histogram of pixel gradation values. Then, the image processing apparatus determines whether or not the background coloring may be removed, based on the histogram. Furthermore, when it is determined that the background coloring may be removed, the image processing apparatus removes the background coloring by using a background level set based on the histogram. However, when such a background removal method is applied to a color image having a background including a chromatic color, a change in color and a collapse of color balance in the document image may occur in some cases.

DESCRIPTION OF THE DRAWINGS

FIG. 10 is a diagram for explaining aspects of a halftone correction.

FIG. 11 is a graph depicting an example of a relationship between a white reference value W3 and a black reference value B1.

FIG. 12 is a diagram illustrating an example of a lookup table.

DETAILED DESCRIPTION

Figure 1:
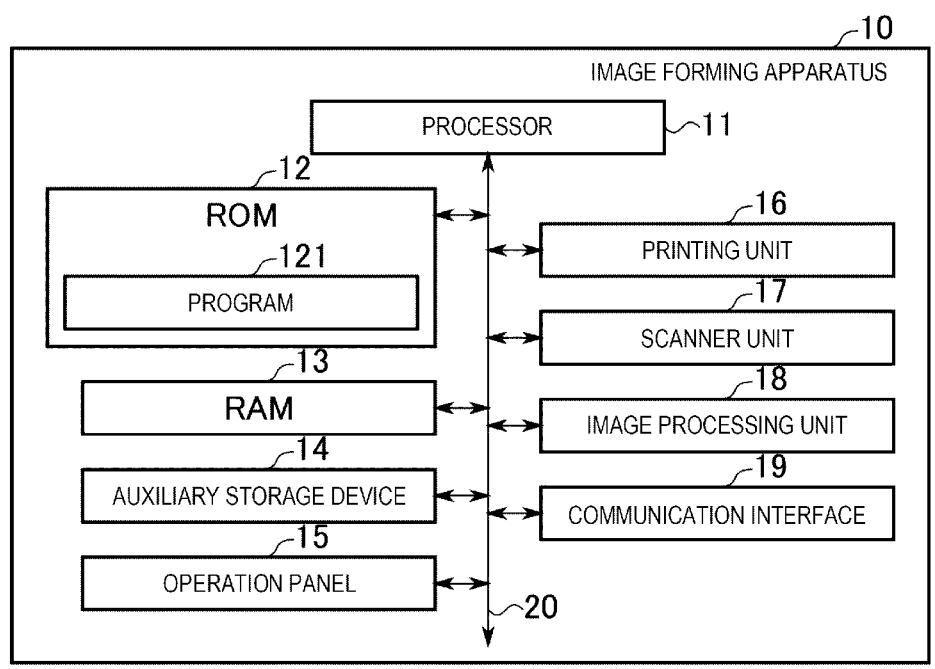
FIG. 1 is a block diagram illustrating an example of an image forming apparatus according to first to fourth embodiments.

In general, according to one embodiment, an image processing unit and a processor. The image processing unit is configured to convert a color image to a monochrome image. The color image comprises pixels with a plurality of color components. The image processing unit generates a histogram from the monochrome image. The histogram shows a color intensity gradation in the monochrome image by pixel frequency. The processor is configured to obtain a first threshold value based on the histogram, determine for each color component of each pixel in the color image whether or not each color component of the pixel is light based on the first threshold value, and generate a corrected color image by removing a background coloring from the color image by correcting each pixel for which all the color components are determined to be light.

Hereinafter, an image forming apparatus according to example embodiments will be described with reference to the drawings. In the drawings, there are cases where the scale of depicted parts are appropriately varied. In addition, the drawings used for the description of the following example embodiments may omit certain aspects of configuration for the purpose of clarity in description of other aspects.

First Embodiment

FIG. 1 is a block diagram illustrating an example of a main circuit configuration of an image forming apparatus 10 according to a first embodiment.

Some examples of the image forming apparatus 10 include an MFP, a copy machine, a printer, a facsimile machine, or the like. The image forming apparatus 10 has, for example, a printing function, a scanning function, a copying function, a decoloring function, a facsimile (FAX) function, or the like. The printing function is forming an image on a medium P (e.g., paper, labels or the like) by using toner or ink. The medium P can be a sheet of paper, for example. The scanning function is reading an image formed on a document. The copying function is printing an image, as read from a document using the scanning function, on the medium P using the printing function. The decoloring function is decolorizing an image formed on the medium P in a decolorable toner material or the like. The image forming apparatus 10 includes, for example, a processor 11, a read-only memory (ROM) 12, a random-access memory (RAM) 13, an auxiliary storage device 14, an operation panel 15, a printing unit 16, a scanner unit 17, an image processing unit 18 and a communication interface 19. These units are connected by a bus 20 or otherwise. The image forming apparatus 10 is one example of an image processing apparatus.

The processor 11 corresponds to a central part of a computer that performs processing such as calculations and provides control necessary for the operations of the image forming apparatus 10. The processor 11 controls the various units to realize the various functions of the image forming apparatus 10 based on a program such as system software, application software or firmware stored in the ROM 12, the auxiliary storage device 14, or the like. A part or the whole of the functions of the program may be implemented in the circuitry of the processor 11. Examples of the processor 11 include a central processing unit (CPU), a micro processing unit (MPU), a system on a chip (SoC), a digital signal processor (DSP), a graphics processing unit (GPU), an application specific integrated circuit (ASIC), a programmable logic device (PLD), a field-programmable gate array (FPGA), or the like. Alternatively, the processor 11 is a combination of a plurality of these possibilites.

The ROM 12 is a nonvolatile memory from which data/information can generally only be read. The ROM 12 stores various programs executed by processor 11. In addition, the ROM 12 stores data or various setting values used for performing various operations of the processor 11.

The RAM 13 is a memory to which data can be written and data can be read. The RAM 13 is used as a so-called work area of the processor 11 for temporarily storing data used by the processor 11 in performing various processes.

The auxiliary storage device 14 is, for example, an electric erasable programmable read-only memory (EEPROM), a hard disk drive (HDD), a solid state drive (SSD), or the like. The auxiliary storage device 14 may also store programs to be executed by the processor 11. Further, the auxiliary storage device 14 stores data used for performing various operations of the processor 11 and data or various parameter values generated in operations of the processor 11. In some examples, the image forming apparatus 10 may be provided with an interface or connector capable of receiving a removable storage medium, such as a memory card or a universal serial bus (USB) memory drive, in place of the auxiliary storage device 14 or in addition to the auxiliary storage device 14.

A program 121 for executing aspects of various processing to be described later is stored in the ROM 12 or altenatively in the auxillary storage device 14 or the like. FIG. 1 shows that the program 121 is stored in the ROM 12 as an example. The image forming apparatus 10 can be transferred to an end user or the like in a state in which the program 121 is stored in the ROM 12, the auxiliary storage device 14, or the like. However, the image forming apparatus 10 may also be transferred to the end user or the like in a state in which the program 121 is not stored in the ROM 12, the auxiliary storage device 14, or the like. Furthermore, the image forming apparatus 10 may be transferred to the end user or the like in a state in which a program that is different from program 121 has been stored in the ROM 12, the auxiliary storage device 14, or the like. In such cases, the program 121 may be separately transferred to the end user or the like, and subsequently written into the ROM 12, the auxiliary storage device 14, or the like by the operation of an administrator, service personnel, an end user or the like. The transfer of program 121 at this later time can be realized by physical transfer of a removable storage medium, such as a magnetic disk, a magneto-optical disk, an optical disk, a non-volatile semiconductor type memory device, or the like, or by download through a network such as the Internet or a local area network (LAN).

The ROM 12 and the auxiliary storage device 14 are examples of non-transitory computer readable media.

The above-described removable storage media, such as magnetic disks, magneto-optical disks, optical disks, non-volatile semiconductor-type memory devices are also examples of non-transitory computer readable media.

Furthermore, in a case where aspects of a program are incorporated in the circuitry of the processor 11, the processor 11 is also an example of a non-transitory computer readable medium.

The operation panel 15 includes buttons, keys, and a touch screen for an operator of the image forming apparatus 10 to input selections and information related to the functions of the image forming appartus. For example, the touch screen is formed by stacking a display such as a liquid crystal display or an organic EL display and a pointing device (touch panel) permitting touch input. Therefore, the buttons, keys, and touch panel function as input devices that receive inputs from the operator of the image forming apparatus 10. The display of the operation panel 15 functions as a display device to notifies an operator of various information.

The printing unit 16 prints an image on the medium P. The printing unit 16 comprises a printer, for example, a laser printer, an ink jet printer, or another type of printer, and performs printing functions using the printer.

The scanner unit 17 reads an image from a document. The scanner unit 17 includes a scanner for reading an image from a document.

The scanner is an optical system including an imaging element, such as a charge-coupled device (CCD) image sensor, for example. Alternatively, the scanner is a contact image sensor (CIS) type including an imaging element, such as complementary metal-oxide-semiconductor (CMOS) image sensor. Alternatively, the scanner may be any other known type of document image capturing device.

Figure 2:
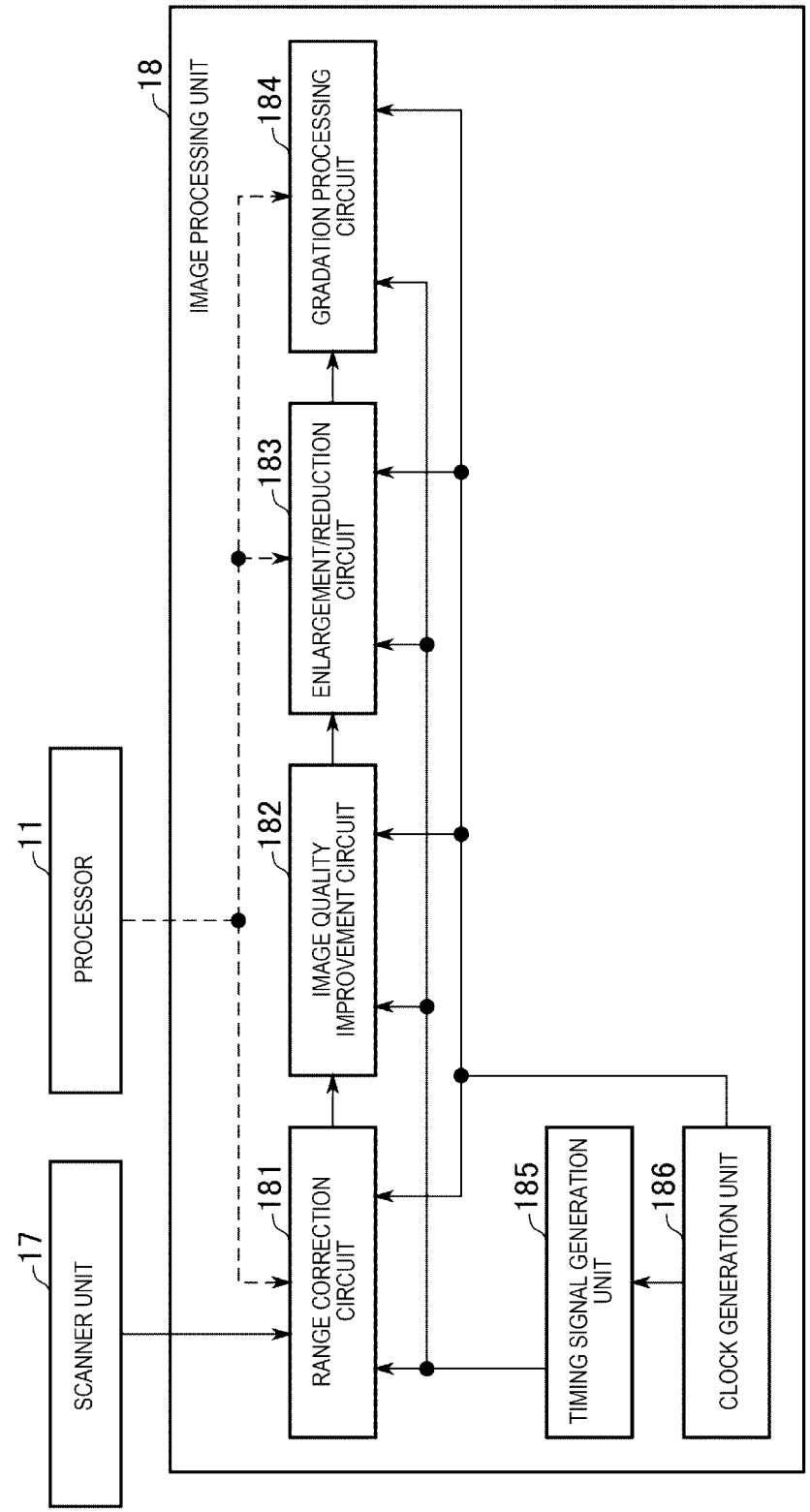
FIG. 2 is a block diagram illustrating an example of an image processing unit.

The image processing unit 18 is, for example, a circuit that performs image processing on images read by the scanner unit 17. The image processing unit 18 includes, for example, a range correction circuit 181, an image quality improvement circuit 182, an enlargement/reduction circuit 183, a gradation processing circuit 184, a timing signal generation unit 185, and a clock generation unit 186, as shown in FIG. 2. The processor 11 and the scanner unit 17 are also illustrated in FIG. 2.

Figure 3:
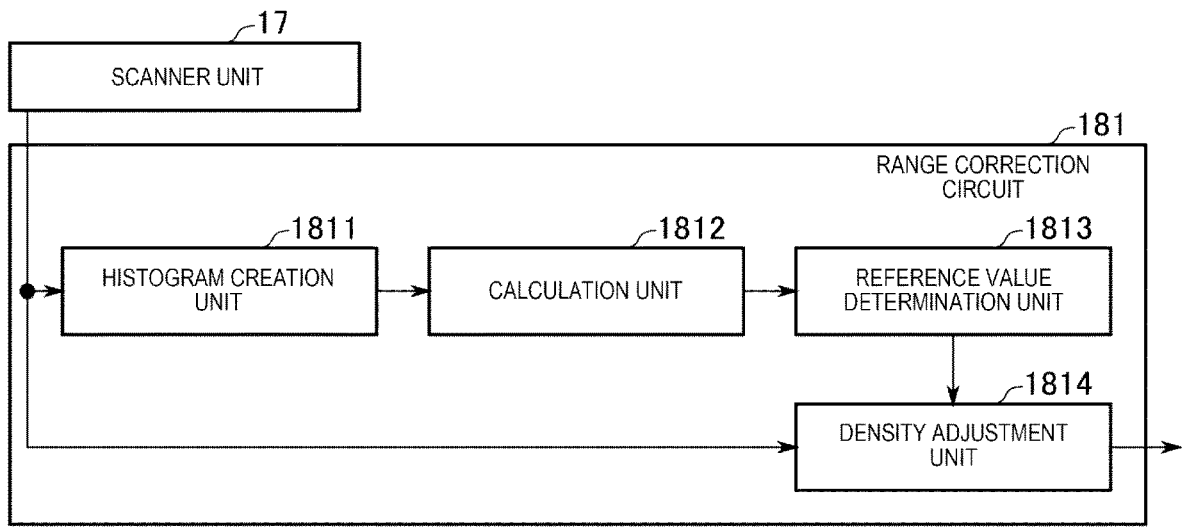
FIG. 3 is a block diagram illustrating a range correction circuit.

The range correction circuit 181 corrects the range of color density in the image data recieved from the scanner unit 17 or the like. FIG. 3 is a diagram illustrating a configuration of the range correction circuit 181. In addition to the range correction circuit 181, the scanner unit 17 is also illustrated in FIG. 3. The range correction circuit 181 is an example of a processing unit.

The range correction circuit 181 includes a histogram creation unit 1811, a calculation unit 1812, a reference value determination unit 1813, and a density adjustment unit 1814.

The histogram creation unit 1811 creates a gradation histogram from the image data supplied from the scanner unit 17. Therefore, the histogram creation unit 1811 is an example of a generation unit that generates a histogram. The range correction circuit 181 is an example of the generation unit.

The calculation unit 1812 calculates a white reference value and a black reference value for gradation adjustment based on the histogram created by the histogram creation unit 1811.

The reference value determination unit 1813 determines a final white reference value and a final black reference value from the white reference value and the black reference value calculated by the calculation unit 1812.

The density adjustment unit 1814 performs color density adjustment processing on the image data using the white reference value and the black reference value determined by the reference value determination unit 1813.

The image quality improvement circuit 182 performs processing on the image data as corrected by the range correction circuit 181 to refine image quality of the processed image data.

The enlargement/reduction circuit 183 performs enlargement/reduction processing on the refined image data from the image quality improvement circuit 182.

The gradation processing circuit 184 performs gradation processing on the image data output from the enlargement/reduction circuit 183.

The timing signal generation unit 185 generates various timing signals and supplies the timing signals to the range correction circuit 181, the image quality improvement circuit 182, the enlargement/reduction circuit 183, and the gradation processing circuit 184, respectively.

The clock generation unit 186 generates various clock signals and supplies the various clock signals to the range correction circuit 181, the image quality improvement circuit 182, the enlargement/reduction circuit 183, the gradation processing circuit 184, and the timing signal generation unit 185, respectively.

The communication interface 19 is an interface through which the image forming apparatus 10 communicates through a network such as a LAN or the Internet. The image forming apparatus 10 communicates with, for example, a personal computer (PC), a server, a smart phone, or the like through the communication interface 19.

The bus 20 includes a control bus, an address bus, a data bus, and the like of the image forming apparatus 10.

Figure 4:
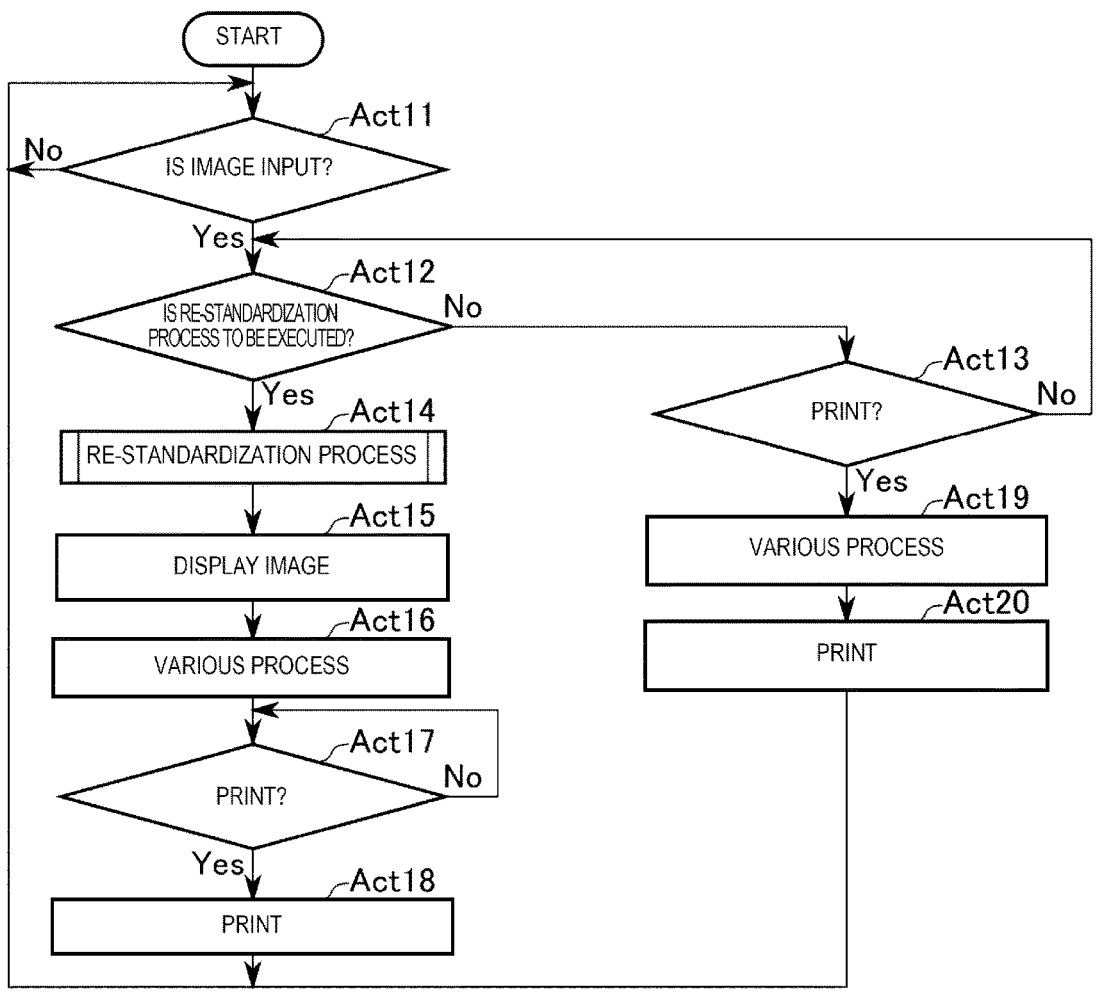
FIG. 4 is a flowchart of aspects of a processing according to a first embodiment.
Figure 5:
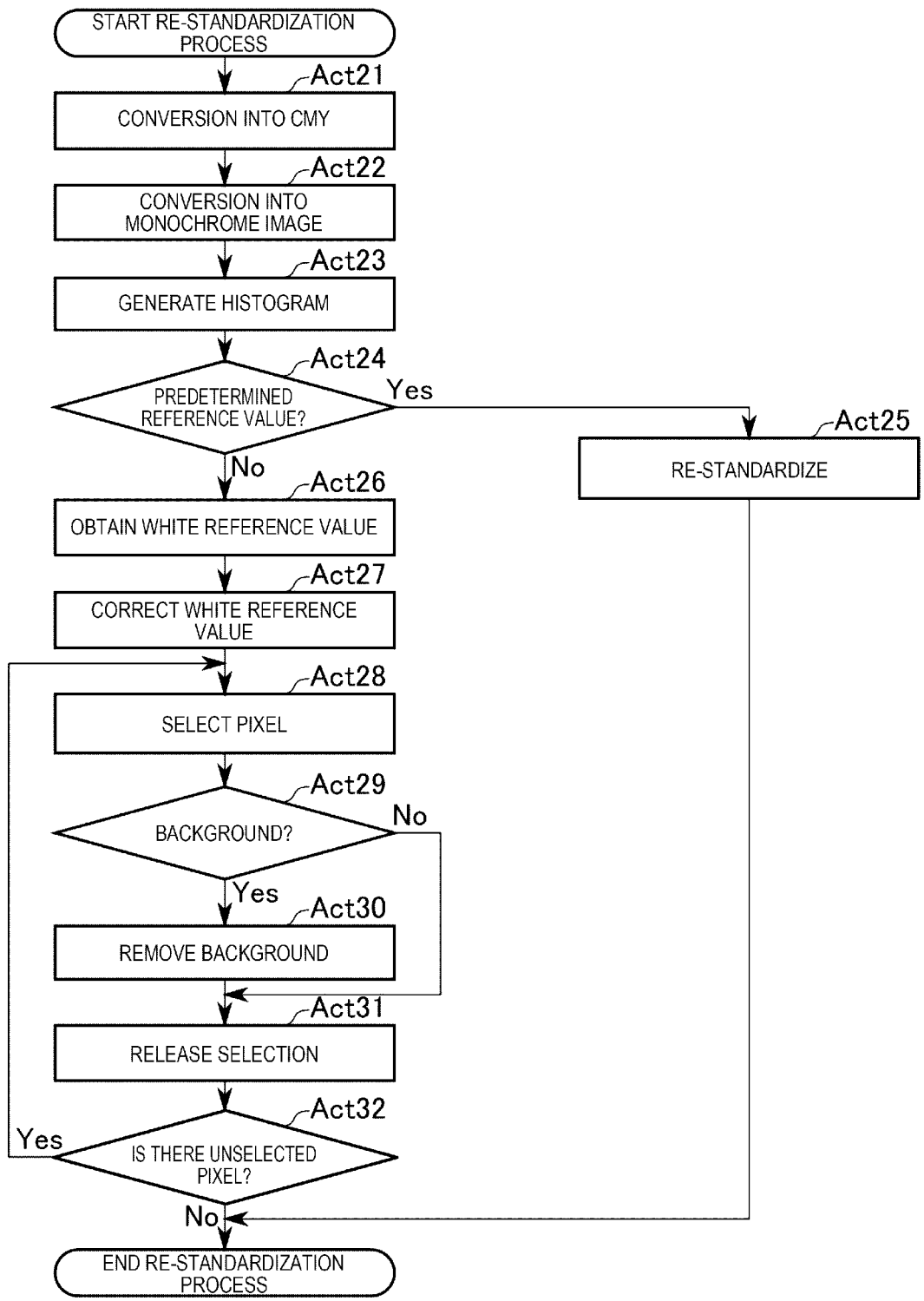
FIG. 5 is a flowchart of aspects of a processing according to the first embodiment by a range correction circuit or a processing according to a fifth embodiment by a processor.

The operation of the image forming apparatus 10 according to the first embodiment will be described based on FIGS. 4 and 5. In addition, the contents of processes in the following description are one example, and various types of processing capable of achieving similar results can be utilized. FIG. 4 is a flowchart of processing by the processor 11. The processor 11 executes the processing based on the program 121 stored in the ROM 12, the auxiliary storage device 14, or the like. FIG. 5 is a flowchart of a processing by the range correction circuit 181. For example, the range correction circuit 181 executes the processing based on its internal circuit configuration. Alternatively, the range correction circuit 181 may execute the processing based on a program stored in the ROM 12, the auxiliary storage device 14, the image processing unit 18, or the like. Alternatively, the range correction circuit 181 may execute the processing based on both the circuit configuration and the program.

In this description for cases where the processor 11 or the range correction circuit 181 proceeds to the next act (Act (N+1)) directly after a completion of a processing of a prior act (Act N (where N is a natural number)), the specific description explaining this aspect may be omitted.

In Act 11, the processor 11 waits for the input of an image. For example, when an image is read by the scanner unit 17, the image will be input to the processor 11. Alternatively, the image may be transmitted from a personal computer (PC), a server, a smart phone or the like via the communication interface 19, then input to the processor 11. Alternatively, an image stored in the auxiliary storage device 14 can read and then input to the processor 11. Once the image is input, the processor 11 makes a determination of Yes in Act 11 and advances to Act 12.

In Act 12, the processor 11 determines whether to execute a re-standardization process or not. When the re-standardization processing is not to be executed, the processor 11 makes a determination of No in Act 12 and advances to Act 13.

In Act 13, the processor 11 determines whether or not to execute printing. The processor 11 makes a determination of No in Act 13 if printing is not to be executed and returns to Act 12. Thus, the processor 11 repeats Act 12 and Act 13 until it is determined to either execute the re-standardization process or to perform printing.

The processor 11 determines to execute a re-standardization process, for example, when it is has been selected to automatically execute the re-standardization process. The selection is set by, for example, an administrator, an operator, or a designer/manufacturer of the image forming apparatus 10. For example, when the processor 11 receives an instruction to execute the re-standardization process, the processor 11 determines to execute the re-standardization process. The instruction can be based, for example, on the operation on the operation panel 15. Alternatively, the instruction can be based on a command received via the communication interface 19 or the like.

Once it is determined to execute the re-standardization process, the processor 11 makes a determination of Yes in Act 12 and advances to Act 14.

In Act 14, the processor 11 sends the image input in Act 11 to the range correction circuit 181 to make the range correction circuit 181 execute the re-standardization process. The range correction circuit 181 starts there-standardization process shown in FIG. 5 in response to receiving the image. The image sent to the range correction circuit 181 will be referred to as "input image" below.

In Act 21 shown in FIG. 5, the range correction circuit 181 converts the input image into a cyan, magenta, and yellow (CMY) color mode. In a case where the input image is already in the CMY color mode, the range correction circuit 181 does not perform the conversion to the CMY color mode. The CMY color mode includes three color signals of cyan, magenta and yellow colors. Each color signal indicates the intensity/density of each respective color component. The image data as read by the scanner unit 17 is typically in a red, green, and blue (RGB) color mode. The RGB color mode includes three color signals of red, green and blue colors. The input image converted to the CMY color mode or the input image already in the CMY color mode are referred to as a "CMY image" below. The input image is an example of a color image. The CMY image is an example of a color image.

The input image is, for example, an image read by the scanner unit 17. Therefore, the scanner unit 17 is an example of an acquisition unit that acquires the color image. The input image can also be, for example, an image received by the communication interface 19. Therefore, the communication interface 19 is also an example of an acquisition unit. The input image can be, for example, an image stored by the auxiliary storage device 14. Therefore, the auxiliary storage device 14 is also an example of an acquisition unit.

In Act 22, the range correction circuit 181 converts the CMY image into a monochrome image. The range correction circuit 181 can use any known method as a method of converting the CMY image into a monochrome image. Herein, the CMY image which has been converted into a monochrome image is referred to as a "monochrome image". The number of bits used for a monochrome image is not limited, but an 8-bit image of a single color is used as a particular example in the following description. That is, the gradation of each pixel of the monochrome image is indicated as one of 256 possible levels in the range of 0 to 255. As an example, in the monochrome image, a pixel of a gradation value 0 is considered white (colorless), a pixel of a gradation value 255 is considered black, which is darkest value, and according to this gradation scale the higher the number is, the darker the corresponding pixel color is. Alternatively, in the monochrome image, a pixel of a gradation value 0 can be considered darkest black and a pixel of a gradation value 255 is considered white, such that the pixel color is darker as the gradation scale numbers get smaller. However, in the following description, it is assumed that the higher the number, the darker the pixel of the monochrome image is.

Figure 6:
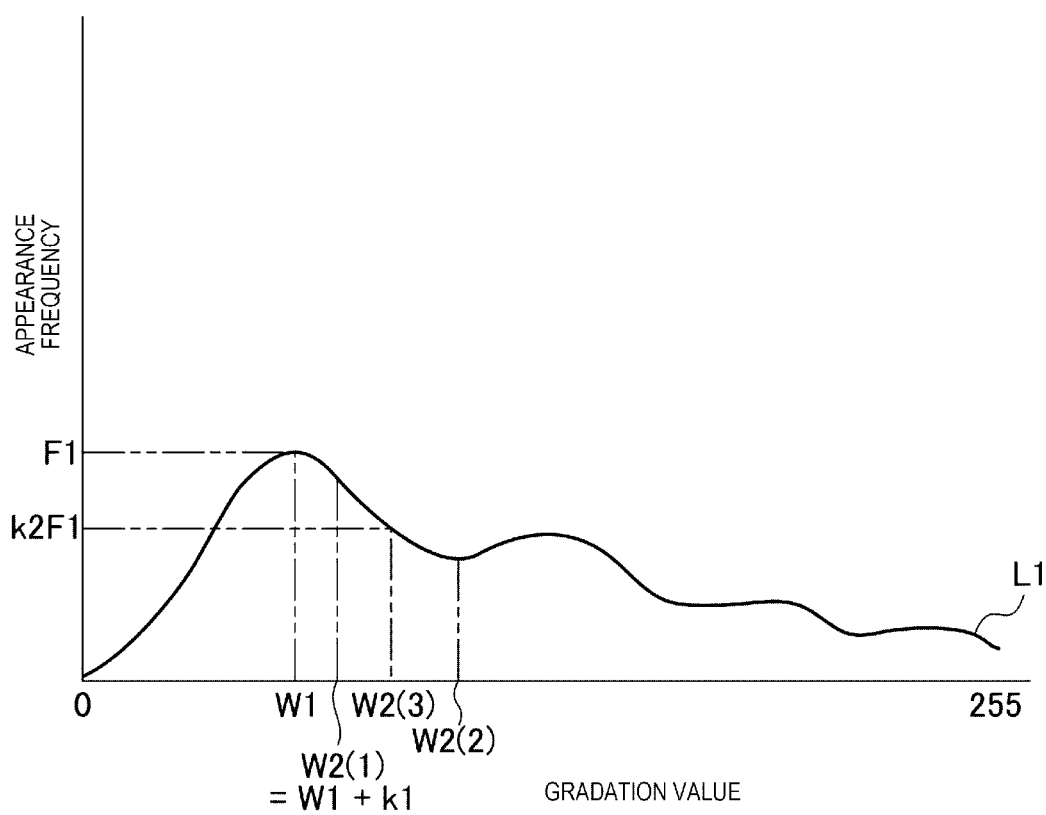
FIG. 6 depicts an example of a monochrome histogram.

In Act 23, the range correction circuit 181 generates a histogram showing an appearance frequency (e.g., number of pixels) for each gradation value in the monochrome image. This histogram is referred to as "monochrome histogram" below. An example of a monochrome histogram is shown in FIG. 6. A curve L1 is obtained by graphing the monochrome histogram. In the process of Act 23, for example, the monochrome histogram created by the histogram creation unit 1811 is an example of a histogram showing the gradation of a color indicated by a monochrome signal.

In Act 24, the range correction circuit 181 determines whether re-standardization is to be performed by using a predetermined reference value. For example, when the type of the document corresponding to the input image is a photograph, the range correction circuit 181 performs re-standardization by using a predetermined reference value. The range correction circuit 181 executes determination of the following conditional aspects (a1) to (a3). In a case where any one of the conditional aspects (a1) to (a3) is satisfied, the range correction circuit 181 estimates that the document corresponding to the input image is a photograph, and determines that re-standardization is to be performed by using a predetermined reference value.

(a1)
The maximum value of the appearance frequency in the monochrome histogram is less than a preset threshold value.

(a2)
The width of any peak in the monochrome histogram is greater than a preset threshold value.

(a3)
There are three or more peaks with a frequency value larger than a preset threshold value in the monochrome histogram.

In a case where any one of (a1) to (a3) is satisfied and it is determined that re-standardization is to be performed by using the predetermined reference value, the range correction circuit 181 makes a determination of Yes in Act 24 and advances to Act 25.

In Act 25, the range correction circuit 181 re-standardizes the CMY image by using a predetermined fixed reference value. The processing of Act 25 is performed by, for example, the density adjustment unit 1814. The reason why the fixed reference value is used here is that it is typically difficult to obtain an appropriate reference value for background removal from a histogram when an input image is like a photograph. If a reference value in such a case was obtained from the histogram, then color of the whole image may change, which is likely to cause additional troubles. Therefore, a fixed reference value set such that noise generated when reading with the scanner can be removed is selected, and the background removal is performed based on the fixed reference value for photograph-like images.

On the other hand, in a case where none of (a1) to (a3) is satisfied and it is determined that re-standardization is to be performed without using the predetermined reference value, the range correction circuit 181 makes a determination of No in Act 24 and advances to Act 26.

In Act 26, the range correction circuit 181 obtains the white reference value W1 based on the monochrome histogram. For example, the range correction circuit 181 sets the gradation value at which the appearance frequency is the maximum peak within some in a region having a density value in the monochrome histogram likely to correspond to the background color of input image to be the white reference value W1. The process of Act 26 is performed by, for example, the calculation unit 1812.

In Act 27, the range correction circuit 181 corrects the white reference value W1 to obtain the white reference value W2. The following three methods (b1) to (b3) are exemplified as a method for correcting the white reference value W1 to obtain the white reference value W2.

(b1)
The range correction circuit 181 sets a value obtained by adding a predetermined value k1 ($0 \leq k1$) to the white reference value W1 as a white reference value W2(1).

(b2)
The range correction circuit 181 sets the smallest one among gradation values which are larger than the white reference value W1 and whose appearance frequency indicates the minimum value, as the white reference value W2(2).

(b3)
The range correction circuit 181 sets the smallest one among gradation values that satisfy the following conditions (b3-1) and (b3-2), as the white reference value W2(3).

(b3-1) The appearance frequency is equal to or less than the value obtained by multiplying the appearance frequency F1 in the white reference value W1 by a predetermined value k2. Here, it is assumed that $0<k2<1$. The value k2 is, for example, one half, two thirds, or the like.

(b3-2) Be larger than the white reference value W1.

In any of (b1) to (b3), it can be said that the white reference value W2 is a value obtained from the white reference value W1 using a predetermined function. Further, the range correction circuit 181 may obtain the white reference value W2 by other functions. It is preferable that the white reference value W2 has a relationship of $W2>W1$. By using such a white reference value W2, the range correction circuit 181 can appropriately remove the background coloring. The process of Act 27 is performed by the reference value determination unit 1813, for example.

In Act 28, the range correction circuit 181 selects a pixel included in the CMY image.

In Act 29, the range correction circuit 181 determines whether or not the selected pixel is a background color removal target. For example, when the gradation value of cyan for the selected pixel is equal to or less than the white reference value W2, the gradation value of magenta of the selected pixel is equal to or less than the white reference value W2, and the gradation value of yellow of the selected pixel is equal to or less than the white reference value W2, the range correction circuit 181 determines that the selected pixel is a background color removal target. If the selected pixel is a background coloring removal target, the range correction circuit 181 makes a determination of Yes in Act 29 and advances to Act 30.

In general, the fact that a particualr gradation value is equal to or less than the white reference value W2 means that the color corresponding to the gradation value is light. Accordingly, the white reference value W2 is an example of a first threshold value for determining whether or not a pixel color is light. As described above, the range correction circuit 181 performs the process of Act 27 to obtain the white reference value W2 based on the monochrome histogram. In addition, the range correction circuit 181 determines whether the gradation value of each color (CMY) is light for a pixel based on the white reference value W2 by performing the process of Act 29.

In Act 30, the range correction circuit 181 sets all the gradation values of cyan, magenta, and yellow to 0 for the selected pixel. Thus, the selected pixel thus becomes white (colorless).

After the process of Act 30, the range correction circuit 181 advances to Act 31. Further, if it is determined that a selected pixel is not a background coloring removal target, the range correction circuit 181 makes a determination of No in Act 29 and advances to Act 31 (skipping Act 30).

In Act 31, the range correction circuit 181 release the selection state of the selected pixel.

In Act 32, the range correction circuit 181 determines whether or not there are pixels remaining in the CMY image that have not yet been selected and processed. If there are unselected pixels, the range correction circuit 181 makes a determination of Yes in Act 32 and returns to Act 28. Thus, the range correction circuit 181 eventually performs the processes of Act 28 to Act 31 on all the pixels included in the CMY image. Thus, the enitirety of the CMY image is re-standardized. The re-standardization process is an operation of replacing one gradation value of a pixel with another gradation value according to a predetermined rule. The processes of Act 28 to Act 31 are performed by, for example, the density adjustment unit 1814.

As described above, the range correction circuit 181 performs the process of Act 30, thereby removing a background coloring by setting those pixels of the image having color components that are determined to be light to be white (colorless). On the other hand, if it is determined that even one of the color components (CMY) of a pixel is greater than a threshold value, the range correction circuit 181 does not determine the pixel to be a background pixel and does not set the pixel to be white (colorless).

The range correction circuit 181 outputs the re-standardized CMY image. Various processes are performed on the image output from the range correction circuit 181 by the image quality improvement circuit 182, the enlargement/reduction circuit 183, and the gradation processing circuit 184.

Once there is no remaining unselected pixels, the range correction circuit 181 makes a determination as No in Act 32 and ends the re-standardization process shown in FIG. 5. The processor 11 ends the process of Act 14 of FIG. 4 and advances to Act 15.

In Act 15, the processor 11 generates an image corresponding to the preview screen. Then, the range correction circuit 181 instructs the operation panel 15 to display the generated image. Upon receiving this instruction, the operation panel 15 displays a preview screen.

The preview screen displays re-standardized image (from Act 14), and may be additionally processed/corrected after restandardization. The preview screen is a screen for the operator to check the quality of the re-standardized image.

In Act 16, the processor 11 controls the image processing unit 18 so as to execute various processes on the image that has been subjected to the re-standardization process. In accordance with this control, the image quality improvement circuit 182, the enlargement/reduction circuit 183, and the gradation processing circuit 184 of the image processing unit 18 execute various processes on the image.

In Act 17, the processor 11 determines whether or not to execute printing. The processor 11 determines to execute printing, for example, when it is set to automatically execute printing. The setting is set by, for example, an administrator, an operator or a designer of the image forming apparatus 10. Furthermore, the processor 11 determines to execute printing when an instruction to execute printing is received. The instruction may be based, for example, on the operation on the operation panel 15 by a user. Alternatively, the instruction is based on a command received via the communication interface 19 or the like. For example, if the operator determines that printing may be executed after checking the preview screen, the instruction operation is performed. When the printing is to be performed, the processor 11 makes a determination of Yes in Act 17 and advances to Act 18.

In Act 18, the processor 11 controls the printing unit 16 so as to print the image that has been subjected to the re-standardization process in Act 14 and the various processings of Act 16. The printing unit 16 prints the image on the medium P. After the process of Act 18, the processor 11 returns to Act 11.

Furthermore, when the processor 11 determines to execute printing without re-standardization of the image while in the standby state of Act 12 and Act 13, the processor 11 makes a determination of Yes in Act 13 and advances to Act 19.

In Act 19, the processor 11 controls the image processing unit 18 so as to execute various processes on the image input in Act 11. In accordance with this control, the image quality improvement circuit 182, the enlargement/reduction circuit 183, the gradation processing circuit 184, and the like of the image processing unit 18 execute various processes on the image.

In Act 20, the processor 11 controls the printing unit 16 so as to print the image that has been subjected to various processing in Act 19. The printing unit 16 prints the image on the medium P. After the process of Act 20, the processor 11 returns to Act 11.

In the image forming apparatus 10 of the first embodiment, only pixels for which all three colors of cyan, magenta, and yellow in the CMY image are determined to be light are corrected to colorless. Thus, since the image forming apparatus 10 of the first embodiment does not correction process only according to a specific pixel color value, it is possible to remove the background coloring while suppressing an overall change in color and a collapse of the color balance in the final image.

Second Embodiment

Since an image forming apparatus 10 of a second embodiment has the same configuration as that of the first embodiment, a description of the configuration will be omitted.

Figure 7:
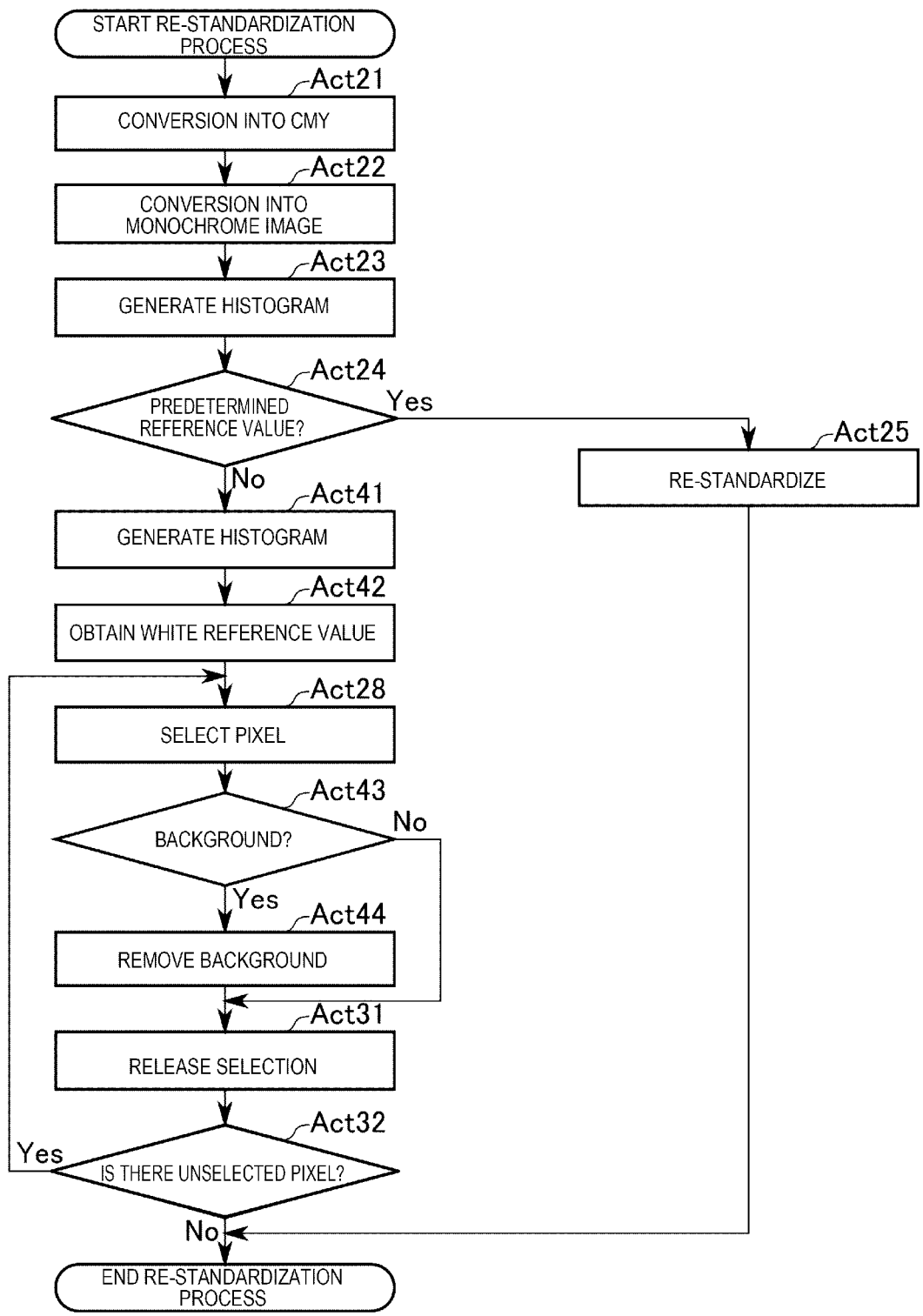
FIG. 7 is a flowchart of aspects of a processing according to a second embodiment by a range correction or a processing according to a fifth embodiment by a processor.

The operation of the image forming apparatus 10 according to the second embodiment will be described based on FIGS. 4 and 7. In addition, the contents of processes in the following description are an example, and various types of processing capable of achieving similar results can be suitably utilized. The processor 11 of the second embodiment performs the process shown in the flowchart of FIG. 4 as was also the case for the first embodiment. However, the range correction circuit 181 in the second embodiment performs the process shown in the flowchart of FIG. 7, instead of FIG. 5. FIG. 7 is a flowchart of a processing by the range correction circuit 181. For example, the range correction circuit 181 executes processing based on its circuit configuration. Alternatively, the range correction circuit 181 may execute processing based on a program stored in the ROM 12, the auxiliary storage device 14, the image processing unit 18, or the like. Alternatively, the range correction circuit 181 may execute processing based on both its circuit configuration and a program. In FIG. 7, processes substantially similar to those previously described in conjunction with FIG. 5 for the first embodiment are denoted by the same reference numerals. For the second embodiment, description of those processes or aspects which are same as in the first embodiment will be omitted.

If No is determined in Act 24 of FIG. 7, the range correction circuit 181 advances to Act 41.

In Act 41, the range correction circuit 181 generates a histogram showing an appearance frequency for each gradation value, with respect to each color of a CMY image.

Figure 8:
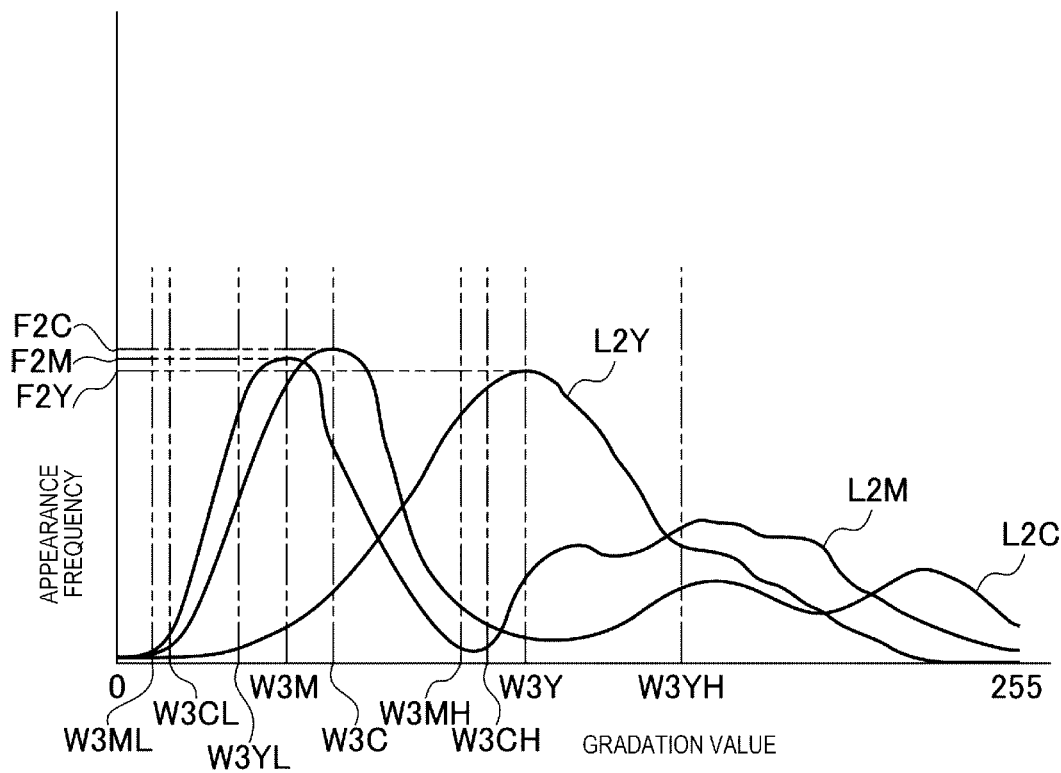
FIG. 8 depicts an example of a color histogram.

That is, with respect to the CMY image, the range correction circuit 181 generates a histogram for the cyan channel (hereinafter referred to as "cyan histogram"), a histogram for the magenta channel (hereinafter referred to as "magenta histogram"), and a histogram for the yellow channel (hereinafter referred to as "yellow histogram"). Hereinafter, the cyan histogram, the magenta histogram, and the yellow histogram are collectively referred to as a "color histogram". An example of a color histogram is shown in FIG. 8. A curve L2C is obtained by graphing a cyan histogram. A curve L2M is obtained by graphing a magenta histogram. A curve L2Y is obtained by graphing a yellow histogram. The curve L2C, the curve L2M, and the curve L2Y are collectively referred to as curves L2. The process of Act 41 is performed by, for example, the histogram creation unit 1811.

In Act 42, the range correction circuit 181 obtains a white reference value W3, a white reference value W3H, and a white reference value W3L for each color of the CMY image. Here, the white reference value W3 for the cyan channel is denoted as a white reference value W3C, a white reference value W3 for magenta channel is denoted as a white reference value W3M, and a white reference value W3 for the yellow channel is denoted as a white reference value W3Y. Similarly, a white reference value W3H is respectively denoted for each color channel (CMY) as a white reference value W3CH, a white reference value W3MH, and a white reference value W3YH. Similarly, a white reference value W3L is respectively denoted for each color channel (CMY) as a white reference value W3CL, a white reference value W3ML, and a white reference value W3YL. Here, the magnitude relationship among the white reference values W3, the white reference values W3H, and the white reference values W3L for each color channel is W3L<W3<W3H. That is, it is established that W3CL<W3C<W3CH, W3ML<W3M<W3MH, and W3YL<W3Y<W3YH.

For example, the range correction circuit 181 sets the gradation value when the appearance frequency of cyan becomes the maximum, based on the cyan histogram, as the white reference value W3C. The range correction circuit 181 sets the gradation value when the appearance frequency of magenta becomes the maximum, based on the magenta histogram, as the white reference value W3M. Further, the range correction circuit 181 sets the gradation value when the appearance frequency of yellow becomes the maximum, based on the yellow histogram, as the white reference value W3Y. In addition, the method of obtaining the white reference value W3 as described above is an example, and the range correction circuit 181 may obtain the white reference value W3 of each color by other methods.

The range correction circuit 181 sets the white reference value W3L as the value indicating the rising edge of the peak (upwardly protruding portion) including the white reference value W3, and the white reference value W3H as the value indicating the falling edge of the peak for each curve L2. For example, the range correction circuit 181 obtains the white reference value W3H of each color by using one of the following methods (c1) to (c3).

(c1)
The range correction circuit 181 sets the minimum gradation value at which the curvature of the curve L2 is positive and the slope of the curve L2 is x1 or more in a range greater (higher in gradation value) than the white reference value W3, as the white reference value W3H. Here, x1 is a predetermined negative number.

(c2)
The range correction circuit 181 selects the minimum value among gradation values that satisfy the following conditions (c2-1) and (c2-2), as the white reference value W3H.

(c2-1) The appearance frequency is equal to or less than the value obtained by multiplying the appearance frequency F2 in the white reference value W3 by a predetermined value x2. Here, it is assumed that 0<x2<1. In addition, it is assumed that the appearance frequency F2 for the white reference value W3C is referred to as the appearance frequency F2C, the appearance frequency F2 for the white reference value W3M is referred to as the appearance frequency F2M, and the appearance frequency F2 for the white reference value W3Y is referred to as the appearance frequency F2Y.

(c2-2) Be larger than the white reference value W3.

(c3)
The minimum value of gradation values satisfying all the three conditions obtained by adding the following condition (c3-1) to the above conditions (c2-1) and (c2-2) is selected as the white reference value W3H.

(c3-1) The curvature of the curve L2 is positive, and the slope of the curve L2 is x3 or more. Here, x3 is a predetermined negative number.

In a case where the white reference value W3L cannot be obtained by the method of (c1) or (c2), the range correction circuit 181 sets the white reference value W3L to 255, for example. Here, 255 indicates the maximum gradation value. Therefore, in a case where the example is not the 8-bit image, some other value would be set as the maximum value instead of 255.

For example, the range correction circuit 181 obtains the white reference value W3L of each color by using the following method (d1) or method (d2).

(d1)
The range correction circuit 181 selects the maximum gradation value at which the curvature of the curve L2 is positive and the slope of the curve L2 is y1 or less in a range lower (in gradation value) than the white reference value W3, as the white reference value W3L. Here, y1 is a predetermined positive number. Further, as an example, y1=−x1.

(d2)
The range correction circuit 181 selects the maximum value among gradation values that satisfy the following conditions (d2-1) and (d2-2) as the white reference value W3L.

(d2-1) The appearance frequency is equal to or less than the value obtained by multiplying the appearance frequency F2 in the white reference value W3 by a predetermined value y2. Here, it is assumed that 0<y2<1. As an example, y2=x2.

(d2-2) Be smaller than the white reference value W3.

In a case where the white reference value W3L cannot be obtained by the methods of (d1) or (d2), the range correction circuit 181 sets the white reference value W3L to 0, for example.

(d3)
The maximum value of gradation values satisfying all the three conditions obtained by adding the following condition (d3-1) to the above conditions (d2-1) and (d2-2) is selected as the white reference value W3L.

(d3-1) The curvature of the curve L2 is positive, and the slope of the curve L2 is y3 or less. Here, y3 is a predetermined positive number. Further, as an example, y3=−x3.

After the process of Act 42, the range correction circuit 181 advances to Act 28. The process of Act 42 is performed by, for example, the calculation unit 1812, and the reference value determination unit 1813.

After the process of Act 28, the range correction circuit 181 advances to Act 43.

In Act 43, the range correction circuit 181 determines whether or not the selected pixel is a pixel of a background removal target. For example, when the gradation value of cyan for the selected pixel is the white reference value W3CL or more and the white reference value W3CH or less, the gradation value of magenta of the selected pixel is the white reference value W3ML or more and the white reference value W3MH or less, and the gradation value of yellow of the selected pixel is the white reference value W3YL or more and the white reference value W3YH or less, the range correction circuit 181 determines that the selected pixel as a pixel of a background removal target. If it is determined that the selected pixel is a pixel of a background removal target, the range correction circuit 181 makes a determination of Yes in Act 44 and advances to Act 30. On the other hand, if it is determined that the selected pixel is not a pixel of a background removal target, the range correction circuit 181 makes a determination of Yes in Act 43 and advances to Act 44.

As described above, the white reference value W3H is an example of a second threshold value for determining whether or not the color component has a low density. Further, the white reference value W3L is an example of a third threshold value for determining whether or not the density of a color component is higher than a predetermined value. The range correction circuit 181 obtains the white reference value W3L and the white reference value W3H by performing the process of Act 42. Further, the range correction circuit 181 determines whether the color indicated by each gradation value is light based on the white reference value W3 corresponding to each color by performing the process of Act 43.

In Act 44, the range correction circuit 181 sets all the gradation values of cyan, magenta, and yellow to 0, for the selected pixel. Thus, the pixel becomes white (colorless).

As described above, the range correction circuit 181 processes all the pixels included in the CMY image. Thus, the CMY image is re-standardized. The processes of Act 28, Act 43, Act 44, and Act 31 are performed by, for example, the density adjustment unit 1814.

As described above, the range correction circuit 181 performs the process of Act 44, thereby removing a background coloring for all pixels for which all the constituting color components are determined to have a density in a specific range.

The image forming apparatus 10 of the second embodiment thus has provides similar effects as that of the first embodiment.

The image forming apparatus 10 of the second embodiment obtains white reference values W3 corresponding to cyan, magenta, and yellow, respectively. The image forming apparatus 10 of the second embodiment determines whether the color is light by using all white reference values W3, respectively. Thus, unlike the first embodiment, the image forming apparatus 10 of the second embodiment can remove the background coloring, with respect to a background for which at least one color is darker than the white reference value W2. On the other hand, when even one of the color components constituting a pixel is not present in a particular range, the image forming apparatus 10 of the second embodiment does not set the pixel as a background removal target. That is, the image forming apparatus 10 of the second embodiment does not select any pixel that satisfies at least one of the following three conditions (i) to (iii) as a background removal target. (i) The density of the yellow component is higher than W3YH. (ii) The density of the magenta component is higher than W3MH. (iii) The density of the cyan component is higher than W3CH.

Third Embodiment

Since an image forming apparatus 10 of a third embodiment has the same configuration as those of the first embodiment and the second embodiment, description of the configuration will be omitted.

Figure 9:
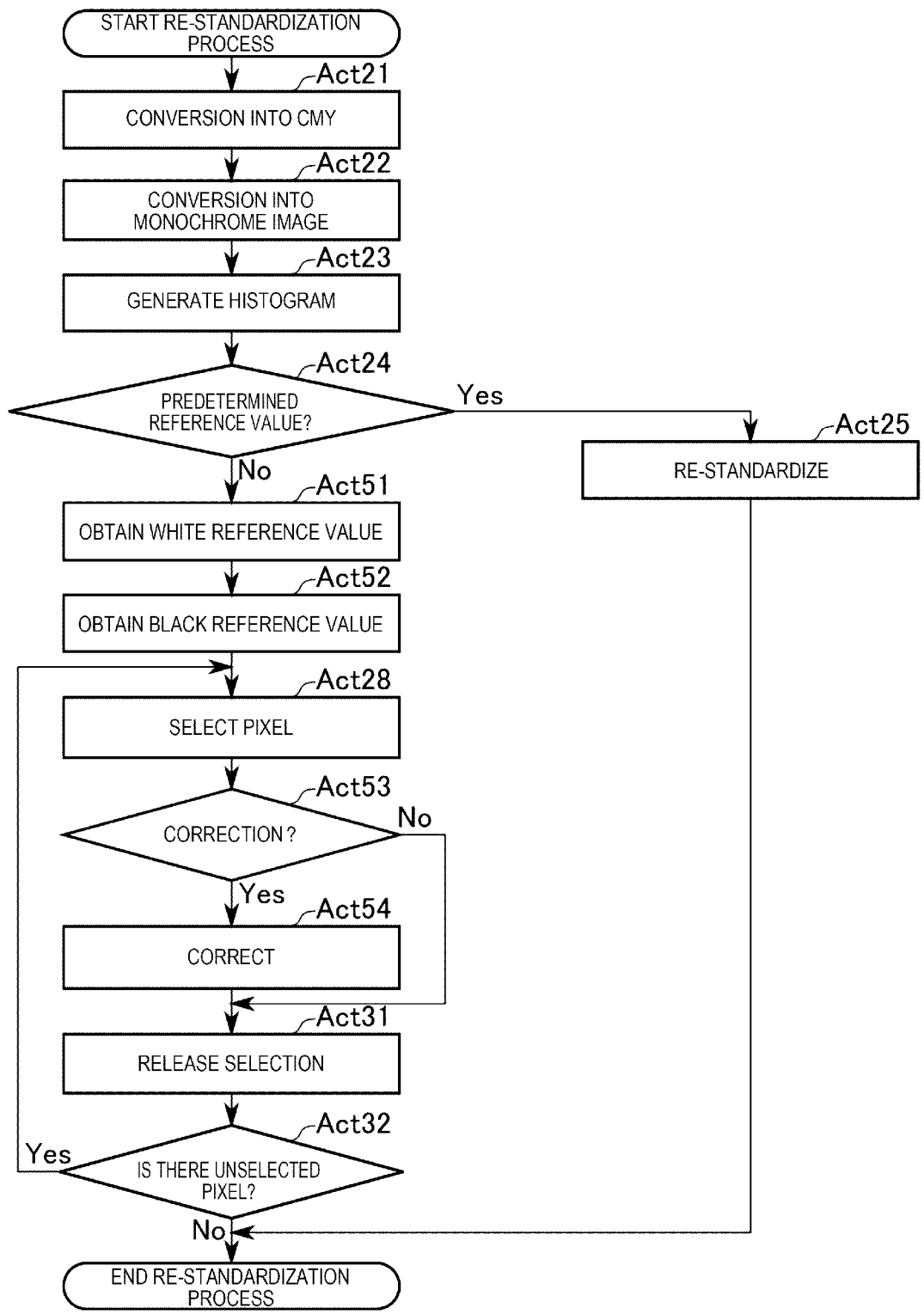
FIG. 9 is a flowchart of aspects of a processing according to a third embodiment by a range correction circuit or a processing according to a fifth embodiment by a processor.

The operation of the image forming apparatus 10 according to the third embodiment will be described based on FIGS. 4 and 9. In addition, the contents of processes in the following description are an example, and various types of processing capable of achieving similar results can be suitably utilized. The processor 11 of the third embodiment performs the process shown in the flowchart of FIG. 4, as with the first and second embodiments. However, the range correction circuit 181 of the third embodiment performs the process shown in the flowchart of FIG. 9 instead of FIG. 5 for the first embodiment. FIG. 9 is a flowchart of a process by the range correction circuit 181. For example, the range correction circuit 181 executes the processing based on its internal circuit configuration. Alternatively, the range correction circuit 181 may execute processing based on a program stored in the ROM 12, the auxiliary storage device 14, the image processing unit 18, or the like. Alternatively, the range correction circuit 181 may execute processing based on both its circuit configuration and a program. In FIG. 9, processes substantially similar to those described in conjunction with FIG. 5 for the first embodiment are denoted by the same reference numerals and explanation will be omitted for those processes similar to those in the first embodiment.

The third embodiment relates to a halftone correction process. First, a halftone correction will be described in conjunction with FIG. 10.

A curve L3 shown in FIG. 10 is obtained by graphing a monochrome histogram. From this monochrome histogram, the range correction circuit 181 sets a white reference value W4 and a black reference value B1. Then, the range correction circuit 181 expands the range between the white reference value W4 and the black reference value B1 in the curve L3 to correspond to the range from the gradation value 0 to the black reference value B1. Thus, the curve L4 is obtained. The above process is a halftone correction process. In the halftone correction, re-standardization is performed on those pixels having a gradation value equal to or less than some predetermined value (here, the black reference value B1).

In Act 51, the range correction circuit 181 obtains the white reference value W4 based on the monochrome histogram. For example, the range correction circuit 181 sets the gradation value when the appearance frequency is a maximum in a range corresponding to the white background portion as the white reference value W4. The process of Act 51 is performed by, for example, the calculation unit 1812.

The range correction circuit 181 further obtains a white reference value W4H (see FIG. 11). The white reference value W4H is, as an example, a value corresponding to the falling edge of the peak including the white reference value W4 in the curve L3 representing a monochrome histogram. For example, the range correction circuit 181 obtains the white reference value W4H used for each color (CMY) by using one of the following methods (e1) to (e3). In the curve L3 representing a monochrome histogram, the horizontal axis is the gradation value, and a vertical axis is the appearance frequency.

(e1)

The range correction circuit 181 sets the minimum gradation value at which the curvature of the curve L3 representing the monochrome histogram is positive and the slope of the curve L3 is z1 or more within in a range higher than the white reference value W4 as the white reference value W4H. Here, z1 is a predetermined negative number.

(e2)

The range correction circuit 181 sets the minimum value among gradation values that satisfy the following conditions (e2-1) and (e2-2) as the white reference value W4H.

(e2-1) The appearance frequency is equal to or less than the value obtained by multiplying the appearance frequency F3 in the white reference value W4 by a predetermined value z2. Here, it is assumed that 0<z2<1.

(e2-2) Be larger than the white reference value W4.

(e3)

The minimum value of gradation values satisfying all the three conditions obtained by adding the following condition (e3-1) to the above conditions (e2-1) and (e2-2) is set as the white reference value W4H.

(e3-1) The curvature of the curve L3 representing the monochrome histogram is positive, and the slope of the curve L3 is z3 or more. Here, z3 is a predetermined negative number.

In Act 52, the range correction circuit 181 obtains a black reference value B1 based on a function f(W4H) of the white reference value W4H as depicted in FIG. 11. That is, B1=f(W4H). FIG. 11 is a graph showing an example of a relationship between a white reference value W4H and a black reference value B1.

A particular function f is defined by the table T1 shown in FIG. 12 as an example. FIG. 12 depicts a lookup table T1 based on the function f between B1 and W4H. Alternatively, the function f may be established an equation or an approximation thereof. The function f is a function in which the black reference value B1 increases as the white reference value W4H increases. As an example, the magnitude of the black reference value B1 may be proportional to the magnitude of the white reference value W4H. Here, as shown in FIGS. 11 and 12, the black reference value B1 has an upper limit value as an example. For example, as depicted in FIG. 12, the upper limit value of the black reference value B1 is 140. The process of Act 52 is performed by the reference value determination unit 1813, for example.

After the process of Act 52, the range correction circuit 181 advances to Act 28. Then, after the process of Act 28, the range correction circuit 181 advances to Act 53.

In Act 53, the range correction circuit 181 determines whether or not the selected pixel is a pixel to be corrected. For example, when the gradation value (C5) of cyan in the selected pixel is equal to or less than the black reference value B1, the gradation value (M5) of magenta in the selected pixel is equal to or less than the black reference value B1, and the gradation value (Y5) of yellow in the selected pixel is equal to or less than the black reference value B1, the range correction circuit 181 determines that the selected pixel is a pixel to be corrected. If it is determined that the selected pixel is not a pixel to be corrected, the range correction circuit 181 makes a determination of No in Act 53 and advances to Act 31 (skipping ACT 54). On the other hand, if it is determined that the selected pixel is a pixel to be corrected, the range correction circuit 181 makes a determination of Yes in Act 53 and advances to Act 54.

The fact that a gradation value is equal to or less than the black reference value B1 means that the color indicated by the gradation value is light. Accordingly, the black reference value B1 is an example of a fourth threshold value for determining whether or not a color is light.

The range correction circuit 181 performs the processes of Act 51 and Act 52 to obtain the black reference value B1 based on a monochrome histogram. In addition, the range correction circuit 181 determines whether the color indicated by the gradation value of each color (CMY) is light based on the black reference value B1 by performing the process of Act 53.

In Act 54, the range correction circuit 181 corrects each color (CMY) for the selected pixel by use of the following Expressions (1) to (3):

$$C6 = \begin{cases} \frac{C5 - W4H}{B1 - W4H} \times B1 & (C5 > W4H) \\ 0 & (C5 \leq W4H) \end{cases} \quad (1)$$

$$M6 = \begin{cases} \frac{M5 - W4H}{B1 - W4H} \times B1 & (M5 > W4H) \\ 0 & (M5 \leq W4H) \end{cases} \quad (2)$$

$$Y6 = \begin{cases} \frac{Y5 - W4H}{B1 - W4H} \times B1 & (Y5 > W4H) \\ 0 & (Y5 \leq W4H) \end{cases} \quad (3)$$

Where values C5, M5, and Y5 are the gradation values for each color channel before correction and values C6, M6, and Y6 are gradation values for each color channel after correction.

After the process of Act 54, the range correction circuit 181 advances to Act 31.

As described above, the range correction circuit 181 processes all the pixels included in the CMY image. Thus, the CMY image is re-standardized. The processes of Act 28, Act 53, Act 54, and Act 31 are performed by, for example, the density adjustment unit 1814.

As described above, the range correction circuit 181 replaces the density values in the range from the white reference value 0 to the white reference value W4H with 0, and the density values in the range from the white reference value W4H to the black reference value B1 with density values ranging from 0 to the black reference value B1 by performing the process of Act 54.

In an image forming apparatus in the related art, in a halftone correction, re-standardization is performed when the gray value is low. In this case, a change in color and a collapse of color balance will be problems. However, the image forming apparatus 10 of the third embodiment performs re-standardization on the pixels for which all three colors of cyan, magenta, and yellow in the CMY image are determined to be light. Thus, the image forming apparatus 10 of the third embodiment can perform halftone corrections while suppressing the change in color and the collapse of the color balance.

Fourth Embodiment

Since an image forming apparatus 10 of a fourth embodiment has the same configuration as those of the first embodiment to the third embodiment, a description of the configuration will be omitted.

Figure 13:
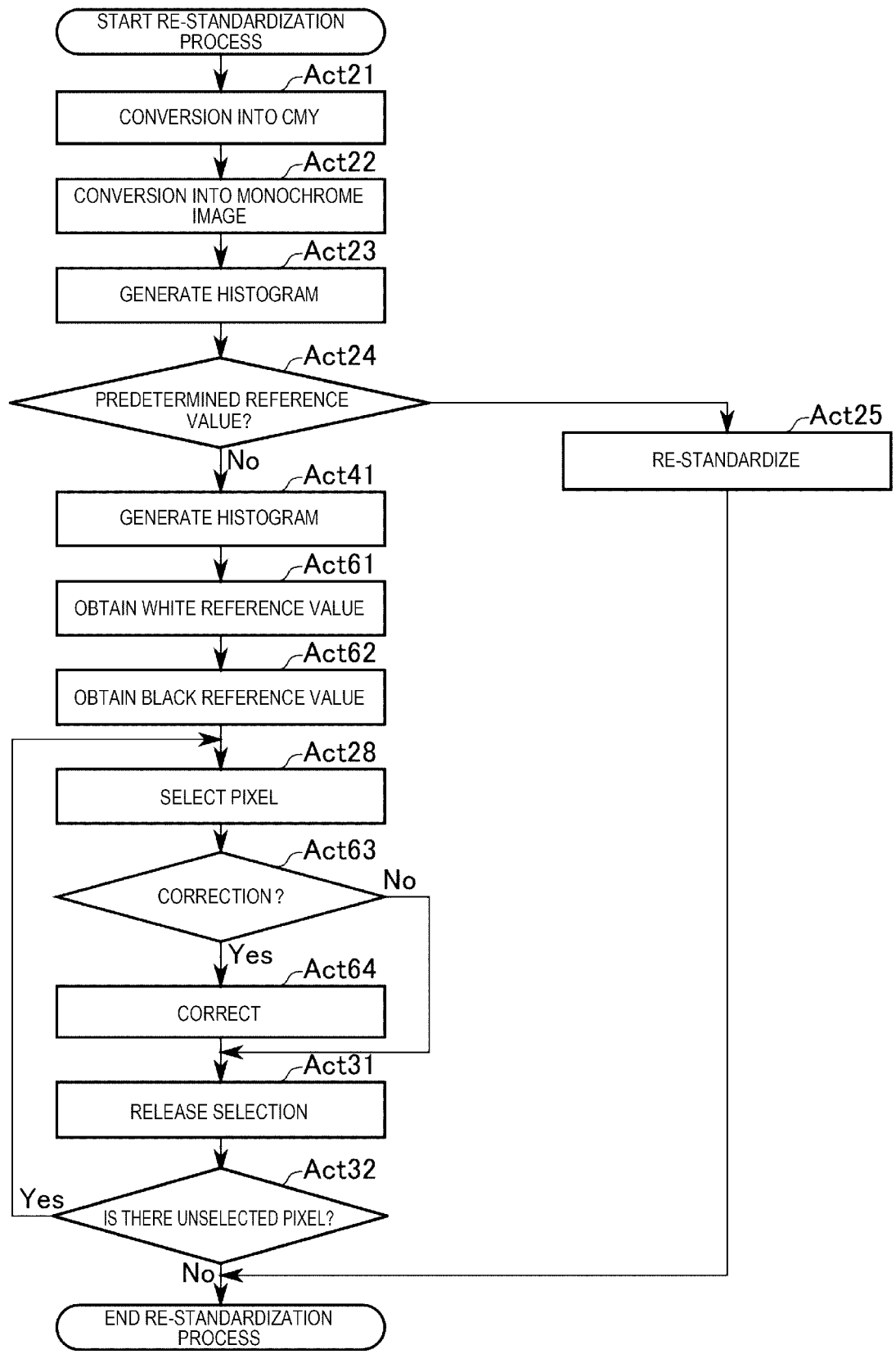
FIG. 13 is a flowchart of aspects of a processing according to a fourth embodiment by a range correction circuit in FIG. 2 or a processing according to a fifth embodiment by a processor.

The operation of the image forming apparatus 10 according to the fourth embodiment will be described based on FIGS. 4 and 13. In addition, the contents of processes in the following description are an example, and various types of processing capable of achieving similar results can be suitably utilized. The processor 11 of the fourth embodiment performs the process shown in the flowchart of FIG. 4 as in the first to third embodiments. The range correction circuit 181 of the fourth embodiment performs the process shown in the flowchart of FIG. 13 instead of FIG. 7 as in the second embodiment. FIG. 13 is a flowchart of a process by the range correction circuit 181. For example, the range correction circuit 181 executes the processing based on its internal circuit configuration. Alternatively, the range correction circuit 181 may execute the processing based on a program stored in the ROM 12, the auxiliary storage device 14, the image processing unit 18, or the like. Alternatively, the range correction circuit 181 may execute the processing based on both its circuit configuration and a program. In FIG. 13, processes substantially similar to those described in conjunction with FIG. 7 for the second embodiment are denoted by the same reference numerals and explanation will be omitted for those processes similar to those in the second embodiment.

The fourth embodiment also utilizes a halftone correction mode.

After the process of Act 41 in FIG. 13, the range correction circuit 181 advances to Act 61.

In Act 61, the range correction circuit 181 obtains a white reference value (W5) for each color (CMY) based on the color histogram. For example, the range correction circuit 181 sets the gradation value for the max appearance frequency within a range indicating the white background portion, as the white reference value W5. Here, the white reference value W5 obtained based on the cyan histogram is denoted white reference value W5C, the white reference value W5 obtained based on the magenta histogram is denoted white reference value W5M, and the white reference value W5 obtained based on the yellow histogram is denoted white reference value W5Y. The process of Act 61 is performed by, for example, the calculation unit 1812.

In Act 62, the range correction circuit 181 obtains the black reference value B2 of each color based on the white reference value W5 of each color. For example, the range correction circuit 181 obtains the black reference value B2C for cyan, based on the value of function g1 (W5C) for the white reference value W5C; the range correction circuit 181 obtains the black reference value B2M for magenta based on the value of function g2 (W5M) for the white reference value W5M; and the range correction circuit 181 obtains the black reference value B2Y for yellow based on the value of function g3 (W5Y) for the white reference value W5Y In this context, the black reference value B2C, the black reference value B2M, and the black reference value B2Y are collectively referred to as a black reference value B2.

The functions g1, g2, and g3 may be the same or different as the function f in the third embodiment. Further, the functions g1, g2, and g3 may be the same function or respectively different functions. As one example, each black reference value B2 has an upper limit similarly to the black reference value B1 in the third embodiment. The process of Act 62 is performed by the reference value determination unit 1813, for example.

After the process of Act 62, the range correction circuit 181 advances to Act 28. Then, after the process of Act 28, the range correction circuit 181 advances to Act 63.

In Act 63, the range correction circuit 181 determines whether or not the selected pixel is a pixel to be corrected. For example, when the gradation value C7 of cyan of the selected pixel is equal to or less than the black reference value B2C, the gradation value M7 of magenta of the selected pixel is equal to or less than the black reference value B2M, and the gradation value Y7 of yellow of the selected pixel is equal to or less than the black reference value B2Y, the range correction circuit 181 determines that the selected pixel is a pixel to be corrected. If the selected pixel is not a pixel to be corrected, the range correction circuit 181 makes a determination of No in Act 63 and advances to Act 31 (skipping Act 64). On the other hand, if the selected pixel is a pixel to be corrected, the range correction circuit 181 makes a determination of Yes in Act 63 and advances to Act 64.

A fact that the gradation value of cyan is equal to or less than the black reference value B2C means that the cyan level is light. Accordingly, the black reference value B2C is an example of a fifth threshold value for determining whether or not the color is light. The fact that the gradation value of magenta is equal to or less than the black reference value B2M means that the magenta level is light. Accordingly, the black reference value B2M is an example of the fifth threshold value for determining whether or not the color is light. The fact that the gradation value of yellow is equal to or less than the black reference value B2Y means that the yellow level is light. Accordingly, the black reference value B2Y is an example of the fifth threshold value for determining whether or not the color is light. The range correction circuit 181 obtains the black reference value B2 by performing the processes of Act 61 and Act 62. Furthermore, the range correction circuit 181 determines whether each gradation value is light based on the black reference value B2 corresponding to each color in performing the process of Act 63.

In Act 64, the range correction circuit 181 corrects each CMY color for the selected pixel by, for example, the following Expressions (4) to (6):

$$C8 = \begin{cases} \frac{C7 - W5C}{B2C - W5C} \times B2C & (C7 > W5C) \\ 0 & (C7 \leq W5C) \end{cases} \quad (4)$$

$$M8 = \begin{cases} \frac{M7 - W5M}{B2M - W5M} \times B2M & (M7 > W5M) \\ 0 & (M7 \leq W5M) \end{cases} \quad (5)$$

$$Y8 = \begin{cases} \frac{Y7 - W5Y}{B2Y - W5Y} \times B2Y & (Y7 > W5Y) \\ 0 & (Y7 \leq W5Y) \end{cases} \quad (6)$$

Here, the values C7, M7, and Y7 are gradation values before correction. The values C8, M8, and Y8 are gradation values after correction.

After the process of Act 64, the range correction circuit 181 advances to Act 31.

The CMY image is re-standardized by the range correction circuit 181 performing the processes as described above on all the pixels included in the CMY image. The processes of Act 28, Act 63, Act 64, and Act 31 are performed by, for example, the density adjustment unit 1814.

As described above, the range correction circuit 181 replaces the density values in the range from 0 to the white reference value W with 0, and the density values in the range from the white reference value W5 to the black reference value B2 with the density in a range from 0 to the black reference value B2 by performing the process of Act 64. Further, the white reference value W5 is an example of the reference value.

The image forming apparatus 10 of the fourth embodiment has a substantially similar effect as that described as the third embodiment.

Fifth Embodiment

Figure 14:
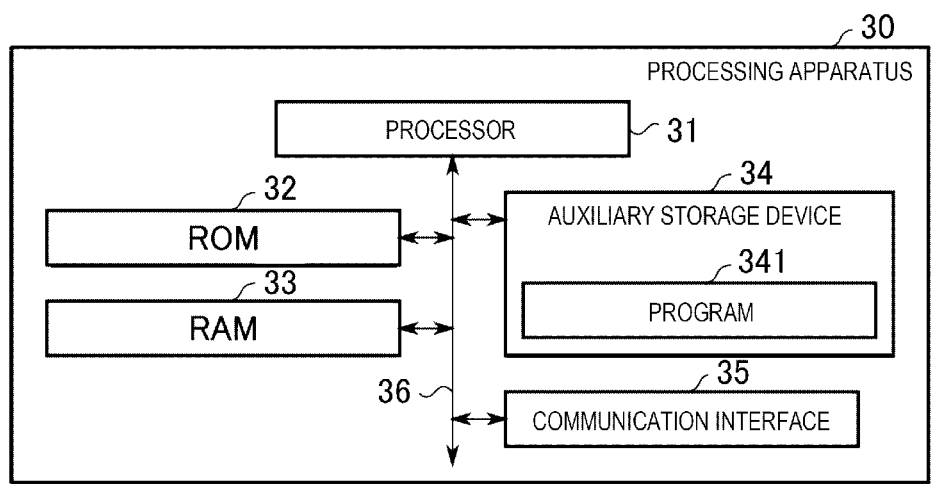
FIG. 14 is a block diagram illustrating an example of a processing apparatus according to a fifth embodiment.

FIG. 14 is a block diagram illustrating an example of a main circuit configuration of a processing apparatus 30 according to a fifth embodiment.

The processing apparatus 30 is a computer such as a PC, a smart phone, a tablet PC, or a server. The processing apparatus 30 includes a processor 31, a ROM 32, a RAM 33, an auxiliary storage device 34, and a communication interface 35, as an example. These units are connected by a bus 36 or the like. The processing apparatus 30 is an example of an image processing apparatus.

The processor 31 corresponds to the central part of a computer that performs processing such as calculation and control necessary for the operation of the processing apparatus 30. The processor 31 controls respective units to realize various functions of the processing apparatus 30 based on a program such as system software, application software, or firmware stored in the ROM 32, the auxiliary storage device 34, or the like. The processor 31 is, for example, a CPU, an MPU, an SoC, a DSP, a GPU, an ASIC, a PLD or an FPGA. Alternatively, the processor 31 is a combination of these components.

The ROM 32 is a nonvolatile memory exclusively used for reading data. The ROM 32 stores programs. In addition, the ROM 32 stores data or various setting values used for performing various processes with the processor 31.

The RAM 33 is a memory used for reading and writing data. The RAM 33 is used as a so-called work area or the like for temporarily storing data used by the processor 31 in performing various processes.

The auxiliary storage device 34 is, for example, an EEPROM, a HDD, or an SSD. The auxiliary storage device 34 may also store programs. Further, the auxiliary storage device 34 stores data used for performing various processes with the processor 31, data or various setting values generated in the processes of the processor 31.

A program stored in the ROM 32 or the auxiliary storage device 34 includes a program 341 for executing an image processing process. FIG. 6 shows as an example that the program 341 is stored in the auxiliary storage device 34; however, as noted, the program may also be stored in ROM 32. As an example, the processing apparatus 30 may be transferred to an administrator, end-user or the like with the program 341 not currently stored in either the ROM 32 or the auxiliary storage device 34. Then, the program 341 may be separately transferred to the administrator, end-user or the like and then written into the auxiliary storage device 34 (or ROM 32) under the operation of the administrator, end-user or the like. However, in other examples the processing apparatus 30 may be transferred with the program 341 already stored in the ROM 32 or the auxiliary storage device 34. The transfer of program 341 can be realized transfer of a removable storage medium such as a magnetic disk, a magneto-optical disk, an optical disk, a semiconductor memory, or the like, or by being downloaded through a network.

The ROM 32 and the auxiliary storage device 34 are each an example of non-transitory computer readable media.

The communication interface 35 is an interface through which the processing apparatus 30 communicates through a network or the like.

The bus 36 includes a control bus, an address bus, a data bus, or the like, and transmits a signals for each unit of the processing apparatus 30.

The operation of the processing apparatus 30 according to the fifth embodiment will be described based on FIGS. 5, 7, 9, and 13. The contents of processes in the following operation description are an example, and various types of processing capable of achieving similar results can be suitably utilized.

In the fifth embodiment, the processor 31 performs a process similar to the processes described in conjunction with at least one of FIGS. 5, 7, 9, and 13 on an image based on the execution of the instructions of program 341. The program 341 when executed cause the processor 31 to perform a process similar to at least one of the flowcharts depicted in FIGS. 5, 7, 9, and 13. The program 341 is included in, for example, an image processing application software. That is, in this fifth embodiment, the processor 31 (based on the program 341 instructions) performs the process(es) that were described as being performed by the range correction circuit 181 in the first embodiment to the fourth embodiment. In this context, the processed image can be an image stored in the auxiliary storage device 34, an image received from outside of the processing apparatus 30, or otherwise any image supplied for processing to the processing apparatus 30.

In the fifth embodiment, the processor 31 executes the program 341 and thus functions as an acquisition unit, a generation unit, and a processing unit. In addition, the processor 31 performs various processes on an inputted color image. Therefore, the processor 31 functions as an input unit that receives a color image.

The processing apparatus 30 of the fifth embodiment can have the same overall effect as described in conjunction with any of the first to the fourth embodiments.

According to the processing apparatus 30 of the fifth embodiment, it is possible to remove the background coloring while suppressing occurrence of a change in color and collapse of the color balance in various apparatuses including a general-purpose apparatus such as a PC.

The first to fifth embodiments can also be modified as follows.

The image forming apparatus 10 or the processing apparatus 30 may be configured not to remove the background coloring in a case where a white reference value is larger than a certain threshold value. Thus, the image forming apparatus 10 and the processing apparatus 30 can prevent the color balance of an image from collapsing.

In the above embodiments, the image forming apparatus 10 or the processing apparatus 30 converts a CMY color mode image into a monochrome image. However, in other examples, the image forming apparatus 10 or the processing apparatus 30 may convert images in other color modes, such as an RGB color mode or a cyan, magenta, yellow, and key (black) (CMYK) color mode, into monochrome images.

In each of the example embodiments described above, the image forming apparatus 10 or the processing apparatus 30 performs a re-standardization process on an image in the CMY color mode. However, the image forming apparatus 10 or the processing apparatus 30 may perform a re-standardization process on images in other color modes such as the RGB color mode or the CMYK color mode.

In above example embodiments, the image forming apparatus 10 or the processing apparatus 30 performs re-standardization for each pixel determined to be light in all the CMY colors. However, the image forming apparatus 10 or the processing apparatus 30 may instead, or in addition to, perform re-standardization in a case where only one or two of the CMY colors are determined to be light. In this case, it is considered that the effect is less as compared with the case where each pixels having all light CMY colors are re-standardized, but it is considered that the change in color and the collapse of color balance is still suppressed as compared with the related art.

In some examples, the white reference value W3L may be a fixed value of 0.

In the third embodiment, the range correction circuit 181 may obtain the black reference value B1 by using a white reference value W4 instead of the white reference value W4H. That is, B1=f(W4). Further, the range correction circuit 181 may use an expression in which the white reference value W4H of Expressions (1) to (3) is replaced with the white reference value W4). In the above case, the white reference value W4 is an example of the reference value.

The processor 11 may realize a part or all of the process described as being realized by operation of a software program in the above embodiments by utilizing instead a dedicated hardware circuit configuration or the like.

The image processing unit 18 and the range correction circuit 181 may realize a part or all of the process described as realized by circuit configuration in the above embodiments by use of a software program or the like.

In one example, an image processing apparatus includes an acquisition unit configured to acquire a color image; a generation unit configured to convert the color image into a monochrome image, and generate a histogram showing a gradation of a color indicated by a monochrome signal; and a processing unit configured to: obtain a first threshold value, and a fourth threshold value for determining whether or not color is light, based on the histogram; determine for each pixel included in the color image, whether or not each color component constituting the pixel is light based on the fourth threshold value; and for pixels for which all constituting color components are determined to be light, replace color of a density in a range from colorless to the first reference value with colorless, and color of a density in a range from the first reference value to the fourth threshold value with color of a density in a range from colorless to the fourth threshold value.

In another example, an image processing apparatus includes: an acquisition unit configured to acquire a color image; a generation unit configured to generate a histogram showing a gradation of color, for each color component of the color image; and a processing unit configured to: obtain a second reference value; obtain a fifth threshold value for determining whether or not each color component constituting each pixel included in the color image has a low density, the second threshold value corresponding to each color component, based on a histogram of a corresponding color component; determine for the pixel, whether or not each of the color components is light, based on a comparison of each of color components constituting the pixel with the fifth threshold value; and for pixels of which all constituting color components are determined to have low densities, replace a density in a range from colorless to the second reference value with colorless, and a density in a range from the second reference value to the fifth threshold value with a density in a range from colorless to the fifth threshold value.

While certain embodiments have been described, these embodiments have been presented by way of example only, and are not intended to limit the scope of present disclosure. Indeed, the novel apparatus and methods described herein may be embodied in a variety of other forms; furthermore, various omissions, substitutions, and changes in the form of the apparatus and methods described herein may be made without departing from the spirit of the present disclosure. The accompanying claims and their equivalents are intended to cover such forms or modifications as would fall within the scope and spirit of the present disclosure.

What is claimed is:

1. An image processing apparatus, comprising:
an image processing unit configured to convert a color image to a monochrome image, the color image comprising pixels with a plurality of color components, the image processing unit configured to generate a histogram from the monochrome image showing a color intensity gradation in the monochrome image by pixel frequency; and
a processor configured to:
obtain a first threshold value based on the histogram,
determine for each color component of each pixel in the color image whether or not each color component of the pixel is light based on the first threshold value, and
generate a corrected color image by removing a background coloring from the color image by correcting each pixel for which all the color components are determined to be light.

2. The image processing apparatus according to claim 1, wherein the image processing unit is configured to determine a document type corresponding to the color image and re-standardizes colors by using a predetermined value if the document type is determined to be a photograph.

3. The image processing apparatus according to claim 1, further comprising:
a scanner to provide the color image.

4. The image processing apparatus according to claim 1, wherein the color image is provided via a network interface.

5. The image processing apparatus according to claim 1, further comprising:
a storage device, wherein the color image is provided from the storage device.

6. The image processing apparatus according to claim 1, wherein the plurality of color components are cyan, magenta, and yellow.

7. The image processing apparatus according to claim 1, wherein the color image is converted to a cyan, magenta, and yellow image prior to conversion to the monochrome image.

8. The image processing apparatus according to claim 1, further comprising:
a scanner to provide the color image; and
a printer configured to print the corrected color image.

9. An image processing method, comprising:
converting a color image into a monochrome image and generating a histogram from the monochrome image showing a color intensity gradation by pixel frequency, the color image comprising pixels with a plurality of color components;
obtaining a first threshold value based on the histogram;
determining for each color component of each pixel in the color image whether or not each color component of the pixel is light based on the first threshold value; and
generating a corrected color image by removing a background coloring by correcting each pixel for which all color components are determined to be light.

10. The image processing method according to claim 9, wherein the plurality of color components are cyan, magenta, and yellow.

11. The image processing method according to claim 9, further comprising:
    determining a document type corresponding to the color image according to the histogram.

12. The image processing method according to claim 9, wherein the color image is provided by a scanner.

* * * * *